United States Patent

Mazon

[11] Patent Number: 6,150,028
[45] Date of Patent: Nov. 21, 2000

[54] GLASS SHEETS INTENDED FOR THE MANUFACTURE OF GLAZING PANELS

[75] Inventor: Pédro Pablo Mazon, Oviedo, Spain

[73] Assignee: Saint Gobain Vitrage, Courbevoie, France

[21] Appl. No.: 08/935,138

[22] Filed: Sep. 22, 1997

[30] Foreign Application Priority Data

Sep. 20, 1996 [FR] France .................................. 96/11521

[51] Int. Cl.$^7$ ...................................................... B32B 17/06
[52] U.S. Cl. .............................. 428/426; 428/34; 428/38; 428/332; 428/432; 428/913; 501/70; 501/71
[58] Field of Search ............................. 428/426, 34, 913, 428/412, 441, 332, 221, 432, 38; 296/84.1; 501/70, 904, 905, 64, 69, 71

[56] References Cited

U.S. PATENT DOCUMENTS

| | | | |
|---|---|---|---|
| 4,619,973 | 10/1986 | Smith, Jr. ............................. | 525/329.9 |
| 4,732,944 | 3/1988 | Smith, Jr. ............................. | 525/329.9 |
| 4,906,703 | 3/1990 | Bolton et al. ........................ | 525/329.9 |
| 5,077,133 | 12/1991 | Cheng .................................. | 428/426 |
| 5,214,008 | 5/1993 | Beckwith et al. ..................... | 501/69 |
| 5,352,640 | 10/1994 | Combes et al. ........................ | 501/71 |
| 5,411,922 | 5/1995 | Jones ................................... | 501/71 |

FOREIGN PATENT DOCUMENTS

| | | |
|---|---|---|
| 0 297 404 B1 | 3/1991 | European Pat. Off. . |
| 0 191 088 B1 | 5/1991 | European Pat. Off. . |
| 0 452 207 A1 | 10/1991 | European Pat. Off. . |
| 0 482 535 A1 | 4/1992 | European Pat. Off. . |
| 0 483 087 A1 | 4/1992 | European Pat. Off. . |
| 0 488 110 A1 | 6/1992 | European Pat. Off. . |
| 0 653 388 A1 | 5/1995 | European Pat. Off. . |
| WO 91/07356 | 5/1991 | WIPO . |
| WO 96/28394 | 9/1996 | WIPO . |

*Primary Examiner*—Deborah Jones
*Assistant Examiner*—Abraham Bahta
*Attorney, Agent, or Firm*—Pennie & Edmonds LLP

[57] ABSTRACT

The invention relates to glass sheets formed from a glass which contains, in percentages by weight, from 1 to 2.5% of total iron expressed in the form of $Fe_2O_3$, the FeO weight content being between 0.3 and 1%, the said sheets exhibiting, for a thickness of between 1 and 1.9 mm, an energy transmittance ($T_E$) of less than 55%. The sheets according to the invention are more particularly intended for the production of laminated glazing panels for motor vehicles.

15 Claims, No Drawings

GLASS SHEETS INTENDED FOR THE MANUFACTURE OF GLAZING PANELS

BACKGROUND OF THE INVENTION

The present invention relates to glass sheets suitable for the production of glazing panels capable of being fitted onto motor vehicles and industrial vehicles, and more specifically serving as laminated glazing panels, for example windscreens.

The laminated glazing panels intended by the invention consist, for example, of two glass sheets and at least one transparent sheet of "ionomer resin".

The expression "ionomer resin" denotes a resin which can be extruded and contains ethylene/carboxylic acid or alpha-olefin/carboxylic acid copolymers, these copolymers being crosslinked by ionic reaction. This type of resin is in particular described in Patents EP-483,087, EP-191,088, U.S. Pat. Nos. 4,619,973, 4,732,944 and 4,906,703 to which reference will be made for the choice of ionomer resins suited to the production of the laminated glasses according to the invention. As ionomer resin, it is possible to use, in particular, resins based on copolymers which are crosslinked by ionic reaction and are obtained by a combination of ethylene, styrene or propylene monomers and of acrylic or methacrylic acid or maleic anhydride monomers. The ionomer resin(s) used in the laminated glazing panel according to the invention is (are) generally based on ethylene (or alpha-olefin)/acrylic (or methacrylic) acid copolymer(s) crosslinked by ionic reaction. The ionomer resins available commercially generally contain the acid copolymers mentioned above, possible partly neutralized, or metal or amine salts of the said acid copolymers (in particular, sodium or zinc ionomers are found).

The sheets of ionomer resin may in particular be obtained by casting, extrusion, etc. Several structures of glazing panels according to the invention may be envisaged, such as the structures described in Patents EP-0,191,088 or EP-0,483,087.

The glazing panels used for this type of application must meet the legal requirements pertaining to their light transmission. Thus, these glazing panels must exhibit an overall light transmittance under illuminant A($TL_A$) at least equal to 70%.

Since the glazed are of motor vehicles is currently very large and the customer requirements in terms of comfort are ever increasing, the constructors of these vehicles seek all means which make it possible to lessen the sensation of heat experienced by the passengers exposed to solar radiation. However, at the same time, the motor-vehicle constructors are seeking to lighten as far as possible all the glass fittings.

In order to maintain a high light transmission in the visible part of the spectrum while still absorbing as much as possible of the rest of the solar energy, it is known to introduce iron into the composition of the glass used for manufacturing the sheets. Iron is present in the glass both in the form of ferric oxide ($Fe_2O_3$) and ferrous oxide (FeO). The presence of $Fe_2O_3$ makes it possible to absorb the UV radiation and that having short wavelengths in the visible part of the spectrum; on the other hand, the presence of FeO makes it possible to absorb radiation in the near IR and that corresponding to long wavelengths in the visible range. Although increasing the iron content, in its two oxidized forms, increases the absorption of radiation at both ends of the visible spectrum, this effect is achieved to the detriment of the light transmission.

To date, various solutions have been proposed in order to make best use of the radiation-absorption capability of iron oxides whilst nevertheless maintaining the highest possible light transmission.

Thus, Patent EP-B-297,404 describes and claims silica-soda-lime glasses whose total iron content, expressed in the form of $Fe_2O_3$ is between 0.45 and 0.65%. These glasses are founded under conditions such that at least 35% and preferably at least 50% of the total iron is in the form of FeO. The increase in the FeO content thus obtained makes it possible to increase the absorption of the glasses in the infrared and to decrease the overall energy transmittance ($T_E$). However, when a glass is founded in the presence of sulphur under highly reducing conditions, the glass takes on an amber colour due to the formation of chromophores resulting from the reaction between the sulphur and the ferric iron. In order to avoid this, it is therefore necessary to remove the sulphates from the charge and, since the sulphur content in a glass is never zero, to ensure that the percentage of ferric iron remains low, which results in the total iron content being strictly limited. It follows that the ability of these glasses to absorb UV radiation is poor.

It is also known to manufacture glasses which, by virtue of a higher total iron content than that recommended by the European patent mentioned above, reconciles good light transmission with good absorption of both infrared and ultraviolet radiation.

Thus, U.S. Pat. No. 5,214,008 describes glasses divested of ceric oxide and other oxides of this type, these glasses containing between 0.7 and 0.95% by weight of total iron expressed in the form of $Fe_2O_3$. These glasses are founded in conventional furnaces, using standard glass-forming batch materials. The degree of oxidation-reduction of the glass is controlled through the introduction of carbon and of sodium sulphate into the charge.

This degree of oxidation-reduction varies within precise limits such that the iron in the form of FeO in the glass varies from 0.19 to 0.24% by weight, the said glass having, for a thickness of between 3.7 and 4.8 millimeters, a light transmittance of greater than 70%, an ultraviolet transmittance of less than 38% and an overall energy transmittance of less than 44.5%.

Other silica-soda-lime glass compositions make it possible to obtain, for a given thickness, a light transmittance at least equal to 70% and good absorption of infrared and ultraviolet radiation. This is particularly the case for those glasses described in Patent Applications EP-A-488,110 and WO-91/07356. Apart from the iron oxides, the glasses recommended by these patent applications contain ceric oxide and titanium oxide.

SUMMARY OF THE INVENTION

The subject of the present invention is a glass sheet formed from a glass capable of being sheeted out on the surface of a bath of molten metal, the transmission characteristics of which are mainly governed by the presence of iron oxides and which has, compared to glass sheets having a comparable overall light transmittance, a capacity to absorb infrared and ultraviolet radiation which is at least equivalent to that of the said sheets but for a smaller thickness.

The subject of the present invention is also glass sheets making it possible to produce laminated glazing panels, in particular for motor vehicles, the thickness of which is less than that of known glazing panels, but which nevertheless exhibit comparable transmission characteristics.

DETAILED DESCRIPTION OF THE INVENTION

These objects are achieved according to the invention by a glass sheet formed from a silica-soda-lime glass which contains, expressed in percentages by weight, from 1 to 2.5% of total iron expressed in the form of $Fe_2O_3$, the weight content of ferrous iron in the form of FeO being between 0.3 and 1%, the said glass exhibiting for a thickness of between 1 and 1.9 mm, an overall energy transmittance ($T_E$) of less than 55% and preferably less than 50%.

Preferably, the glass sheet exhibits, for a thickness of from 1 to 1.9 mm, an overall light transmittance under illuminant A($TL_A$) at least equal to 70%.

Also preferably, the glass sheet exhibits, for a thickness of between 1 and 1.9 mm, an ultraviolet radiation transmittance of less than 25%.

The light and energy transmission values were determined using the Perry Moon Mass 2 method; the transmission in the ultraviolet was determined using the method defined by the ISO 9050 standard.

The glass sheets thus produced according to the invention exhibit the transmission characteristics $T_E$ and $TL_A$ which are required for use as motor-vehicle glazing panels having glass thickness of less than 1.9 mm.

The glasses used for manufacturing the glass sheets according to the invention are founded, using standard batch materials to which cullet may be added, in conventional furnaces used in the context of the float-glass technique. The melting and refining of these glasses took place in fired furnaces provided, optionally, with electrodes which heat the glass right through by passing an electric current between the said electrodes. The degree of oxidation-reduction of the glasses is controlled by means of oxidizing agents, such as sodium sulphate and of reducing agents such as coke. The amount of sodium sulphate introduced into the charge, taking into consideration the characteristics of the furnace in which this charge is melted, is such that the $SO_3$ content in the glass is generally between 0.08 and 0.35%. The content of reducing agents, which is associated with the sulphate, also taking into consideration the characteristics of the furnace for founding the glass, is calculated so that the degree of oxidation-reduction of the said glass is maintained between precise limits. These limits are defined by the extreme values of ratio of the amount of ferrous iron expressed in the form of FeO to the amount of total iron expressed in the form of $Fe_2O_3$. According to the invention, this $FeO/Fe_2O_3$ ratio varies from 25 to 45%.

The glasses used to manufacture the glass sheet according to the invention may furthermore contain up to approximately 0.04% of one or more of the following constituents: CoO, $Cr_2O_3$, Se, $TiO_2$, MnO, NiO, CuO. These constituents may derive from impurities contained in certain of the glass-forming batch materials used and/or from the glass cullet mixed with the glass-forming materials; they may also be intentionally added to the charge in order to give, for example, a particular tinted appearance.

The glasses used to manufacture the glass sheets according to the invention are silica-soda-lime glasses which contain the constituents below in the contents defined by the following limits expressed in percentages by weight:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 1 to 2.5% |
| FeO | 0.3 to 1% |
| CoO, $Cr_2O_3$, Se, $TiO_2$, MnO, NiO, CuO | 0 to 0.04% |
| $SO_3$ | 0.08 to 0.35% |

Apart from the transmission characteristics mentioned above, the glasses used to manufacture the glass sheets according to the invention generally have a blue-green tinge. Their dominant wavelength under illuminant C is generally between 490 and 510 nanometers.

According to a preferred variant of the invention, the FeO content is greater than 35% of the total iron content expressed in the form of $Fe_2O_3$.

In particular according to this preferred variant, the glass sheet according to the invention is advantageously manufactured from a silica-soda-lime glass which contains, expressed in percentages by weight, from 1.5 to 2.5% of the total iron expressed in the form of $Fe_2O_3$, the weight content of ferrous iron in the form of FeO being between 0.5 and 1%.

The glasses used to manufacture the glass sheet according to the invention are preferably silica-soda-lime glasses which contain the constituents below in the contents defined by the following limits expressed in percentages by weight:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 1.5 to 2.5% |
| CoO, $Cr_2O_3$, Se, $TiO_2$, MnO, NiO, CuO | 0 to 0.04% |
| FeO | 0.5 to 1% |
| $SO_3$ | 0.08 to 0.35% |

In another embodiment, the glass sheets according to the invention are preferably manufactured from a glass which contains the constituents below in the contents defined by the following limits expressed in percentages by weight:

| | |
|---|---|
| $SiO_2$ | 68 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 18% |
| $K_2O$ | 0 to 8% |
| $Fe_2O_3$ (total iron expressed in this form) | 1 to 2.5% |
| CoO, $Cr_2O_3$, Se, $TiO_2$, MnO, NiO, CuO | 0 to 0.04% |
| FeO | 0.3 to 1% |
| $SO_3$ | 0.08 to 0.35% |

The sheets, consisting of a glass thus defined, exhibit, for a thickness of between 1 and 1.9 mm, a further improved overall energy transmittance ($T_E$), that is to say even lower.

In the latter embodiment, the glass used to manufacture a glass sheet according to the invention contains, in a preferred variant, an FeO content which represents at least 35% of the total iron content expressed in the form of $Fe_2O_3$.

In particular in this preferred variant, the glass sheet according to the invention is advantageously manufactured from a silica-soda-lime glass which contains, expressed in percentages by weight, from 1.5 to 2.5% of the total iron expressed in the form of $Fe_2O_3$, the weight content of ferrous iron in the form of FeO being between 0.5 and 1%.

The glasses used to manufacture the glass sheet according to this embodiment of the invention are preferably silica-soda-lime glasses which contain the constituents below in the contents defined by the following limits expressed in percentages by weight:

| | |
|---|---|
| $SiO_2$ | 68 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 18% |
| $K_2O$ | 0 to 8% |
| $Fe_2O_3$ (total iron expressed in this form) | 1.5 to 2.5% |
| CoO, $Cr_2O_3$, Se, $TiO_2$, MnO, NiO, CuO | 0 to 0.04% |
| FeO | 0.5 to 1% |
| $SO_3$ | 0.08 to 0.35% |

In general, the glass used to manufacture a glass sheet according to the invention may contain up to 1.5% and preferably at least 0.2% by weight of $CeO_2$ and/or from 200 to 4000 ppm of $TiO_2$ which favour the absorption of ultraviolet radiation.

Likewise, the glass may advantageously contain from 15 to 100 ppm of CoO and preferably from 15 to 50 ppm.

In order for the advantages of the present invention to be more fully appreciated, examples of glass which are used to manufacture the glass sheets according to the invention are given below.

| | THICKNESS: 1 mm | | THICKNESS: 1.6 mm | |
|---|---|---|---|---|
| | No. 1 | No. 2 | No. 3 | No. 4 |
| $SiO_2$ | 70.1% | 71.9% | 70.9% | 72.9% |
| $Al_2O_3$ | 0.6% | 0.95% | 0.6% | 0.85% |
| CaO | 8.2% | 8.4% | 8.3% | 8.2% |
| MgO | 3.8% | 0.35% | 3.6% | 0.25% |
| $Na_2O$ | 13.8% | 14.8% | 13.9% | 14.95% |
| $K_2O$ | 0.85% | 0.5% | 0.22% | 0.5% |
| $Fe_2O_3$ (total) | 2.1% | 2% | 1.59% | 1.50% |
| FeO | 0.86% | 0.8% | 0.59% | 0.54% |
| $SO_3$ | 0.3% | 0.3% | 0.3% | 0.3% |
| Redox | 0.41 | 0.4 | 0.37 | 0.36 |
| $T_{LA}$ (%) | 71% | 71% | 71% | 71% |
| $T_E$ (%) | 48% | 47.5% | 47% | 46% |

The measurements of $TL_A$ and $T_E$ are taken on four different glasses for total glass thicknesses of 1 and 1.6 mm, i.e. corresponding to laminated glazing panels comprising two sheets of glass 0.5 mm and 0.8 mm in thickness, respectively.

These glasses may be converted into continuous ribbon by employing the float-glass technique. The glass sheets according to the invention are obtained by cutting a ribbon which has a thickness of less than 1 millimeter. These glass sheets are used in particular for producing laminated glazing panels intended to be fitted onto motor vehicles. These laminated glazing panels consist, for example, of two glass sheets and at least one intermediate ionomer resin. According to the invention, the glass thickness of the glazing panels, i.e. the sum of the thicknesses of the glass sheets making up the glazing panel, is between 1 and approximately 1.9 mm.

The glazing panels thus produced according to the invention ensure good absorption of the ultraviolet radiation and good thermal comfort and they make it possible to achieve a not-insignificant reduction in the weight of the vehicle's glass fittings.

In the same way as with other glazing panels, the glazing panels obtained from the glasses according to the invention may be subjected beforehand to surface treatments.

What is claimed is:

1. Glass sheet formed from a silica-soda-lime glass which contains, expressed in percentages by weight, from 1 to 2.5% of total iron expressed in the form of $Fe_2O_3$, the FeO weight content being between 0.3 and 1%, the said glass exhibiting for a thickness of between 1 and 1.9 mm, an overall energy transmittance (TE) of less than 55% and an overall light transmittance under illuminant A($TL_A$) of at least 70%.

2. Glass sheet according to claim 1, characterized in that the said glass exhibits, for a thickness of between 1 and 1.9 mm, an ultraviolet radiation transmittance of less than 25%.

3. Glass sheet according to claim 1, characterized in that it consists of a glass in which the ferrous iron content in the form of FeO represents between 25 and 45% of the total iron content expressed in the form of $Fe_2O_3$.

4. Glass sheet according to claim 1, characterized in that said sheet is formed from a glass containing the constituents below in the contents defined by the following limits expressed in percentages by weight:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 1 to 2.5% |
| CoO, $Cr_2O_3$, Se, $TiO_2$, MnO, NiO, CuO | 0 to 0.04% |
| FeO | 0.3 to 1% |
| $SO_3$ | 0.08 to 0.35% |

5. Glass sheet according to claims 3 or 4, characterized in that the FeO content is grater than 35% of the total iron content expressed in the form of $Fe_2O_3$.

6. Glass sheet according to claim 5, characterized in that it is formed from a glass containing the constituents below in the contents defined by the following limits expressed in percentages by weight:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 1.5 to 2.5% |
| CoO, $Cr_2O_3$, Se, $TiO_2$, MnO, NiO, CuO | 0 to 0.04% |
| FeO | 0.5 to 1% |
| $SO_3$ | 0.08 to 0.35% |

7. Glass sheet according to claim 1, characterized in that it is formed from a glass containing the constituents below in the contents defined by the following limits expressed in percentages by weight:

8. Glass sheet according to claim 1, characterized in that it is formed from a glass containing the constituents below in the contents defined by the following limits expressed in percentages by weight:

| | |
|---|---|
| SiO$_2$ | 68 to 75% |
| Al$_2$O$_3$ | 0 to 3% |
| B$_2$O$_3$ | 0 to 5% |
| CaO | 2 to 10% |
| MgO | 0 to 2% |
| Na$_2$O | 9 to 18% |
| K$_2$O | 0 to 8% |
| Fe$_2$O$_3$ (total iron expressed in this form) | 1 to 2.5% |
| CoO, Cr$_2$O$_3$, Se, TiO$_2$, MnO, NiO, CuO | 0 to 0.04% |
| FeO | 0.3 to 1% |
| SO$_3$ | 0.08 to 0.35% |

8. Glass sheet according to claim 1, characterized in that it is formed from a glass containing the constituents below in the contents defined by the following limits expressed in percentages by weight:

| | |
|---|---|
| SiO$_2$ | 68 to 75% |
| Al$_2$O$_3$ | 0 to 3% |
| B$_2$O$_3$ | 0 to 5% |
| CaO | 2 to 10% |
| MgO | 0 to 2% |
| Na$_2$O | 9 to 18% |
| K$_2$O | 0 to 8% |
| Fe$_2$O$_3$ (total iron expressed in this form) | 1.5 to 2.5% |
| CoO, Cr$_2$O$_3$, Se, TiO$_2$, MnO, NiO, CuO | 0 to 0.04% |
| FeO | 0.5 to 1% |
| SO$_3$ | 0.08 to 0.35% |

9. Glass sheet according to claim 1, characterized in that said sheet is formed from a glass containing from 0.2 to 1.5% of CeO$_2$ and/or from 200 to 4000 ppm of TiO$_2$.

10. Glass sheet according to claim 1, characterized in that said sheet is formed from a glass containing from 15 to 100 ppm of CoO and preferably from 15 to 50 ppm.

11. Glazing panel characterized in that it consists of two glass sheets formed from a glass whose chemical composition is defined by claim 1, said sheets being separated by an intermediate sheet of an organic material, characterized in that the thickness of glass in the glazing panel is between 1 and approximately 1.9 mm.

12. Glazing panel according to claim 11, characterized in that the intermediate sheet contains at least one ionomer resin.

13. Glass sheet according to claim 1, wherein the overall energy transmittance (TE) is less than 50%.

14. Glass sheet according to claim 1 wherein the amount of total iron, expressed as Fe$_2$O$_3$, is at least 1.5% and the amount of FeO is at least 0.5%.

15. Glass sheet according to claim 1 having a blue-green color and a dominant wavelength under illuminant C of between about 490 and 510 nanometers.

* * * * *

UNITED STATES PATENT AND TRADEMARK OFFICE
CERTIFICATE OF CORRECTION

PATENT NO. : 6,150,028

DATED : November 21, 2000

INVENTOR : Pédro Pablo MAZON

It is certified that error appears in the above-identified patent and that said Letters Patent is hereby corrected as shown below:

Column 6, line 45 (claim 5, line 2): change "grater" to --greater--.

Column 6, line 48 (claim 6, line 2): change "it" to --said sheet--.

Column 6, line 65 (claim 7, line 2): change "it" to --said sheet--.

Column 7, line 14 (claim 8, line 2): change "it" to --said sheet--.

Column 8, line 13 (claim 11, line 1): change "it" to --said panel--.

Signed and Sealed this

Fifteenth Day of May, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO.    : 6,150,028
DATED         : November 21, 2000
INVENTOR(S)   : Pédro Pablo Mazon It is certified that error appears in the above-identified patent and that said Letters Patent is hereby corrected as shown below:

Column 1,
Line 44, change "are" with -- area --.

Signed and Sealed this

Eighteenth Day of September, 2001

Attest:

Attesting Officer

NICHOLAS P. GODICI
Acting Director of the United States Patent and Trademark Office